United States Patent [19]

Eppley

[11] Patent Number: 4,792,503
[45] Date of Patent: Dec. 20, 1988

[54] MULTI-FUNCTIONAL HERMETIC SEAL FOR NON-AQUEOUS ELECTROCHEMICAL CELLS
[75] Inventor: William J. Eppley, Skippack, Pa.
[73] Assignee: Honeywell Inc., Minneapolis, Minn.
[21] Appl. No.: 148,311
[22] Filed: Jan. 25, 1988
[51] Int. Cl.$^4$ .............................................. H01M 2/30
[52] U.S. Cl. .................................... 429/181; 429/185
[58] Field of Search ................................ 429/181, 185
[56] References Cited
U.S. PATENT DOCUMENTS

| | | | |
|---|---|---|---|
| 3,416,964 | 12/1968 | Michalko | 429/181 |
| 4,233,372 | 11/1980 | Bro et al. | 429/181 |
| 4,358,514 | 11/1982 | Garoutte et al. | 429/181 |

Primary Examiner—Donald L. Walton
Attorney, Agent, or Firm—C. G. Mersereau

[57] ABSTRACT

An improved header device for use with an electrochemical cell requiring a hermetic seal between the header, the terminal pin, and the body of the cell is disclosed. A stainless steel header is sized to fit the cell body and hermetically sealed to the body. An annular glass ring is bonded to the header. Centered in and bonded to the ring is a composite, corrosion resistant terminal pin consisting of a solid central core of stainless steel surrounded on its sides and bottom by a stainless steel case. The case prevents corrosion of the pin and allows the pin to be used as either the positive or negative terminal.

14 Claims, 1 Drawing Sheet

MULTI-FUNCTIONAL HERMETIC SEAL FOR NON-AQUEOUS ELECTROCHEMICAL CELLS

BACKGROUND OF THE INVENTION

1. Field of the Invention

The present invention relates to the field of non-aqueous electrochemical cells which contain highly corrosive chemical components and so require hermetic sealing. More particularly, the invention concerns improvement in the hermetic seals of such cells which reduces corrosion and allows the electrical connector bridging the seal or pin terminal to be either positive or negative.

2. Description of the Prior Art

Non-aqueous electrochemical cells and particularly lithium batteries contain highly reactive components including, for example, such species as lithium, lithium salts, $SO_2$, $SOCl_2$, and $SO_2Cl_2$. Packaging these materials properly is critical, since corrosion can readily destroy the most efficient battery through by-products and leakage. For that reason, stainless steel has become the preferred packing materials for lithium batteries. Stainless steel, particularly 300 series stainless steels are not attached by the corrosive cell materials.

In addition, one other requirement in these high energy batteries is that the cells be hermetically sealed to prevent outside contamination of the cells and prevent leakage which can result in loss of performance and/or damage to the environment. Accordingly, efforts have been made to hermetically seal the battery about the pin terminal, using stainless steel, as mentioned above, and glass which has been found to be an impervious insulator suitable for sealing the battery and preventing shorting of the cell between the anode and cathode.

One such successful device is found in U.S. Pat. No. 4,358,514. That invention involves an hermetic seal (which also is described in detail with regard to FIG. 1 of this application) includes a stainless steel header sized to hermetically fit the body and a glass annular ring bonded to the header. A terminal pin is bonded to the ring with the pin consisting of a solid central core of a material selected from nickel and nickel alloys and a stainless steel sleeve on the core.

That header device permits a hermetic seal between the header, the terminal pin and the body of the cell which does succeed in achieving a good glass-to-metal seal because the glass has a coefficient of expansion close enough to that of the nickel core over the contemplated temperature range. It has certain drawbacks, however. This is true, particularly with respect to corrosion problems which limit the use of such a terminal to the negative terminal only.

The prior art device is based on the premise that nickel must be used for the pin as it must take up the bulk of the expansion/contraction and the thermal coefficient of expansion of nickel closely follows that of the glass. However, the nickel, if made positive, is susceptible to anodic corrosion in the cell environment particularly with respect to the presence of $SO_2$, $SOCl_2$, $SO_2Cl_2$ and other highly reactive solvent depolarizers commonly used in such cells. Therefore, it has heretofore been necessary to make the pin terminal of the cell negative so that it is then protected by the more reactive lithium or other alkali metal in the cell which preferentially decomposes.

SUMMARY OF THE INVENTION

The present invention solves the dual problem of glass-to-metal hermetic sealing of non-aqueous electrochemical cells and prevention of corrosion or decomposition of the pin terminal. More importantly, this also allows the pin terminal to be the positive terminal.

It has been discovered that a pin terminal of the combination of a center core pin of a material having a thermal coefficient of expansion substantially matching that of the glass annular ring and an outer case of a metal chemically resistant to the species of the electrochemical system arranged so that the case material alone is exposed to the cell contents provides the long-sought breakthrough.

In the preferred embodiment, the assembled device comprises a stainless steel annualar ring header sized to hermetically fit the cell body and a glass central annular ring bonded inside of the annular ring of the header. A composite central pin terminal is bonded inside the glass annular ring. The composite terminal pin has a solid central core of a stainless steel material electrically compatible and readily weldable normally by brazing to a stainless steel cup-shaped case having walls and a bottom which is exposed to the contents of the cell. The pin has a thermal coefficient of expansion close to the glass of the annular ring. The case has a nominal wall thickness of 0.005" and a bottom thickness of 0.020". The pin core is normally 0.230" in diameter. The pin core and the case are normally brazed together to form a good mechanical and electrical connection. The bonding of the pin to the glass ring and the stainless ring to the header are accomplished at a nominal elevated temperature of 1600° F.

In one embodiment the central pin core was made of a high chrome stainless steel such as 446 stainless, the case of a 300 series stainless (316L) and the glass annulus was made of aluminoborate glass. The case and pin core were joined by high temperature braze.

BRIEF DESCRIPTION OF THE DRAWINGS

Reference is hereby made to the drawings in which.

DESCRIPTION OF THE PREFERRED EMBODIMENT

Figure 1:
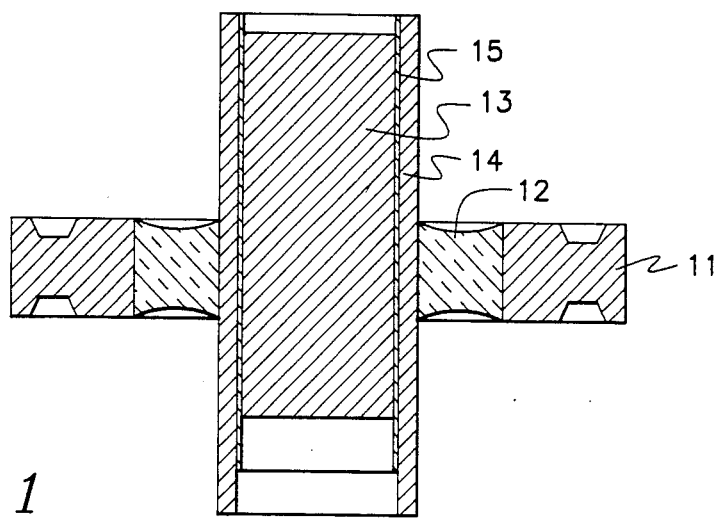
FIG. 1 is a schematic view, in section, of a prior art seal of the class described.

The header device of the prior art device of U.S. Pat. No. 4,358,514 is shown generally in FIG. 1. That invention accomplished the forming of an hermetic seal between the header, the terminal pin and the body of an electrical chemical cell. The stainless steel header 11 is sized to hermetically fit the body of a cell, whereby welding or other hermetically bonding can be accomplished in a conventional manner. An annular glass ring 12 is fitted inside and bonded to the stainless steel header 11. A pin terminal which consists of a central nickel core 13, and a stainless steel sleeve 14 is fitted within the annular glass ring 12. High temperature nickel brazing 15 is applied to keep the thin outer shell 14 solidly bonded to the nickel core 13.

The temperatures of fabrication, which may range from at least 1800° F. to in excess of 2000° F. The brazing 15 further prevents circumferential growth of the sleeve 14. The nickel braze 15 also provides a low resistance electrical contact through the seal to the terminal pin. By making the sleeve 14 slightly longer than the nickel core 13, subsequent trimming of the sleeve and welding of the enclosures into the inside diameter of the sleeve can be accomplished. The glass 12 and the nickel core 13 have relatively closely matched coefficients of expansion, particularly when compared to the coefficient of expansion of the stainless steel.

Figure 2:
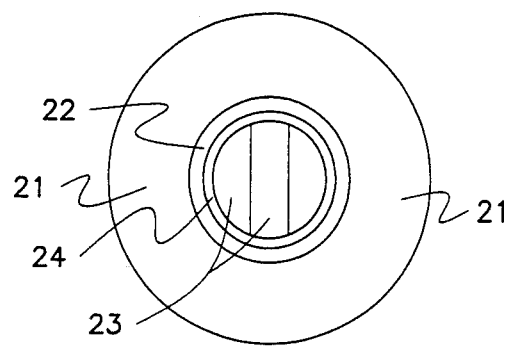
FIG. 2 is a schematic top view showing the preferred embodiment of the present invention.
Figure 3:
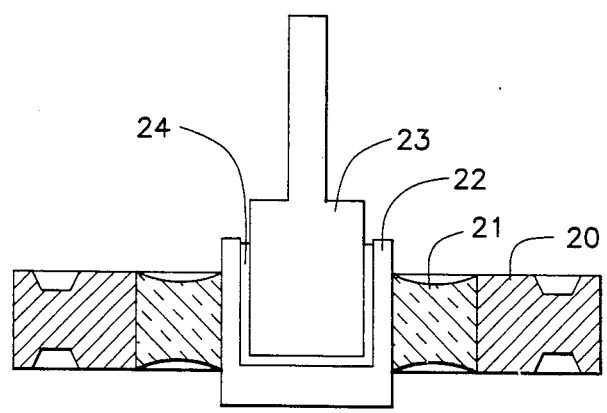
FIG. 3 is a schematic view, in section, of the device shown in FIG. 2.

Now, the cell sealing structure contemplated by the present invention, will be described with respect to FIGS. 2 and 3. The conventional stainless steel torus-shaped header is depicted, in part, at 20 (FIG. 3). Of course, this header is sized to hermetically fit the body of the cell, normally also stainless steel, for which it is designed and can be bonded thereto in any compatible conventional manner such as by welding. Concentrically, inside the header is a glass ring 21 which is typically made of an aluminoborate glass such as Fusite #425 glass manufactured by Fusite Corporation of Cincinnati, Ohio. The terminal pin of the invention is located inside the glass ring 21 and is made up of a composite structure including an outer case surrounding and increasing the lower portion of a solid central pin member 23 and fixed thereto as by high temperature brazing at 24 to present a solid unit with regard to the integrity of the opening in the glass ring 21.

The combination including the glass ring 21, case structure 22, and pin 23 must not only present a compatible unit with respect to maintaining the physical sealing integrity of the header unit, but it must also stand up to the contents of the cell chemically so that the pin may be made the positive terminal in the electrochemical couple without fear of deterioration. In addition, the pin assembly must provide good electrical conductivity through the member 23 while remaining insulated from the cell case and header by means of the glass ring.

Accordingly, it has been discovered that a case member made from a 300 series or high nickel type stainless steel such as type 316L in combination with a solid internal pin of a high chrome type stainless steel, such as type 446, functions very well when used as the terminal pin assembly within a ring of aluminoborate glass. The nominal pin diameter is about 0.248" and the nominal wall thickness of the case member is 0.005". The case may have a bottom thickness of about 0.020".

Control of the chemical reactivity of pin terminals, in addition to the coefficient of expansion, had not been considered in the prior art. Because with the type 316L or similar stainless steel case, unlike the nickel within the sleeve of the prior art, is impervious to the corrosive species in the internal cell environment, the polarity of the pin terminal is no longer a critical factor as it was in the prior art. This chemical compatibility allows the cell to be used much more efficiently with regard to its surroundings than was heretofore possible.

Many applications for cells of this type require placement of one or more of the cells in a metal container. Until the present invention it had been necessary to insulate each cell body from its surroundings when placed in such a container to prevent shorting because the cell body had to be made the positive terminal. This made construction of items employing these cells much more difficult than it would have been had the cell bodies been negative and the pin terminals positive. Now negative cell bodies can be grounded directly to the container into which they are mounted.

The invention, then, allows all the external cell connections to be made with stainless steel and allows flexibility in choosing pin and case polarities.

Having thus described the invention, what is claimed is:

1. An improved sealing construction for the pin terminal of an active metal, non-aqueous electrochemical cell, compromising:
   a stainless steel header sized to hermetically fit the body and having an annular opening therein;
   an annular glass insert disposed in the opening in and sealed to said header, and
   a pin terminal disposed in and sealing the opening in the glass insert and bonded to said ring, said pin terminal further comprising;
      a central pin member of a material selected from stainless steels having thermal coefficients of expansion compatible with the thermal coefficient of expansion of the glass insert,
      a thin-walled cup-shaped member of a material selected from stainless steels substantially unaffected by the internal cell species receiving and bonded to the pin member and sealing the opening in the glass insert such that it electrically connects but physically separates the pin member from the contents of the cell.

2. The device of claim 1 wherein the pin member is substantially 446 stainless steel the glass insert member is substantially aluminoborate glass.

3. The device of 1 wherein the cup-shaped member is substantially type 316L stainless steel.

4. The device of claim 2 wherein the cup-shaped member is substantially type 316L stainless steel.

5. The device of claim 4 wherein the pin member and cup-shaped are brazed together.

6. The device of claim 5 wherein said pin member is brazed to said cup-shaped member bonded to said glass insert at a temperature of about 1600° F.

7. The device of claim 5 wherein said cup-shaped member has a wall thickness between 0.002 inches and 0.005 inches and a bottom thickness between 0.005 inches and 0.020 inches.

8. In an hermetic sealing device for providing a hermetic seal between the pin terminal and body of an active metal, non-aqueous electrochemical cell having a stainless steel header sized to hermetically fit the body and having an opening therein; a glass insert member disposed in and bonded to the header opening in the improvement comprising:
   a composite pin terminal structure disposed in, bonded to and sealing the opening in the glass insert, said pin terminal structure further comprising;
      a central pin member substantially of a material selected from stainless steels having thermal coefficients of expansion compatible with that of the glass insert; and
      a thin-walled stainless steel cup-shaped member of a material substantially unaffected by the cell contents receiving said pin member and bonded to the glass insert in a manner which electrically connects but physically separates the pin member from the contents of the cell.

9. The device of claim 8 wherein the pin member is substantially type 446 stainless steel and the glass insert is substantially aluminoborate glass.

10. The device of claim 8 wherein the cup-shaped member is substantially type 316L stainless steel.

11. The device of claim 9 wherein the cup-shaped member is substantially type 316L stainless steel.

12. The device structure of claim 10 wherein said pin member is brazed to said cup-shaped member.

13. The device of claim 12 wherein said terminal pin is bonded to said ring at a temperature of about 1600° F.

14. The device of claim 12 wherein the wall of said cup-shaped member is between 0.002 inches and 0.005 inches in thickness and the bottom is between 0.005 inches and 0.020 inches in thickness.

* * * * *